Jan. 4, 1966  W. KASTENBEIN  3,227,263
VIBRATORY REGULATION OF AN ENDLESS CONVEYING DEVICE
Filed April 26, 1963  2 Sheets-Sheet 1

INVENTOR
Werner Kastenbein
BY *Spencer & Kaye*
ATTORNEYS

INVENTOR
Werner Kastenbein though with this arrangement the form of the motion path and angle range of the vibration direction are not limited, it has been found preferable to basically guide and drive the frame in such a manner that the main component of this motion path with reference to the conveying direction of the belt has an angle with the horizontal which is larger than 90°, with this angle furthermore preferably being larger than 90°+α, where α=the ascension angle of the belt.

United States Patent Office 3,227,263
Patented Jan. 4, 1966

3,227,263
VIBRATORY REGULATION OF AN ENDLESS CONVEYING DEVICE
Werner Kastenbein, Wallhausen (Bodensee), Germany, assignor to Telefunken Patentverwertungs-G.m.b.H., Ulm (Danube), Germany
Filed Apr. 26, 1963, Ser. No. 275,944
Claims priority, application Germany, Apr. 27, 1962, T 22,028
8 Claims. (Cl. 198—161)

The present invention relates generally to conveying devices, and, more particularly, to a device for feeding bulk goods and especially those in the form of flat shipments, to a conveying path or to a further processing device, and wherein the conveying density of the goods is regulated.

In the automatic processing and distribution of letter mail, the shipments should be quantitatively regulated to provide a flow of shipments which is as uniform as possible. This uniform flow is to be provided from non-processed mail, for present purposes termed "raw mail," which arrives in sacks. Although it is true that the present invention is not limited to this field, it proves to be especially advantageous and suitable for this use.

In the quantitative regulating or controlled rate of flow devices which have been known up to now and used for the abovementioned purposes, attempts have been made to provide the required rate of flow with the aid of an upwardly inclined conveying belt provided with a friction coating, for example. However, due to the mutual adherence of the shipments to each other, reliable quantitative regulation of the shipments was prevented and the operation of these devices was unsatisfactory. A shipment regulating device is known which operates according to the principle of known vibrators and which includes several shaker or vibrator loaders which are connected in a cascade arrangement and are driven in a vibrating manner in the sense of the conveying direction in order to achieve the desired conveying motion. Although with this type of device a good regulation may be achieved under certain operating conditions, poor regulation may also be caused by this device because of the strong vibration damping of the individual shipments which may provide large gaps in the conveying flow of shipments, and such gaps are undesired.

With these defects of the prior art in mind, it is a main object of the present invention to provide a device for properly quantitatively regulating bulk goods and particularly mail shipments.

Another object of this invention is to provide a device wherein vibrating motion is used for quantitatively regulating the flat shipments, which vibration may be adjusted so as to provide optimal quantitative regulation.

A further object is to provide a device of the character described which has an inclined conveyor arranged for optimum operating conditions at the feed end as well as at the discharge end even though these conditions differ.

These objects and others ancillary thereto are accomplished according to preferred embodiments of the invention wherein an upwardly inclined or ascending conveying belt having a friction coating thereon is driven in the desired conveying direction. The drive and guide rollers and the supporting surface for the conveying belt are supported or mounted in a frame so that the belt ascends in the direction of its conveying motion at an acute angle with the horizontal. The frame itself is supported in such a manner as to allow it to vibrate and it is driven to provide a vibrating motion which acts in opposition to the conveying motion of the belt. This vibrating motion provides that the shipments which do not lie directly on top of the belt and in contact with it, lag and remain behind with respect to the conveying motion of the belt. Thus, a new operating principle is used in the present invention by means of which the above-mentioned disadvantages of the prior art devices are avoided.

This is accomplished because the vibrating motion of the frame in which the ascending conveying belt is supported is not effected in the same direction as the conveying is performed, as is done in the case of known vibrators or shakers; but, in the present invention, this is provided in the opposite sense. Although with this arrangement the form of the motion path and angle range of the vibration direction are not limited, it has been found preferable to basically guide and drive the frame in such a manner that the main component of this motion path with reference to the conveying direction of the belt has an angle with the horizontal which is larger than 90°, with this angle furthermore preferably being larger than 90°+α, where α=the ascension angle of the belt.

Since the delivering of the quantitatively regulated shipments is performed solely by the conveying motion of the conveying belt and may be regulated by varying the drive speed of the belt, the vibrating motion may be adjusted as to its direction, amplitude and frequency exclusively from the standpoint of optimal quantitative regulation of the conveying flow.

Additional objects and advantages of the present invention will become apparent upon consideration of the following description when taken in conjunction with the accompanying drawings in which:

FIGURE 3 is a schematic view illustrating an arrangement for controlling the speed of the belt.

Figure 1:
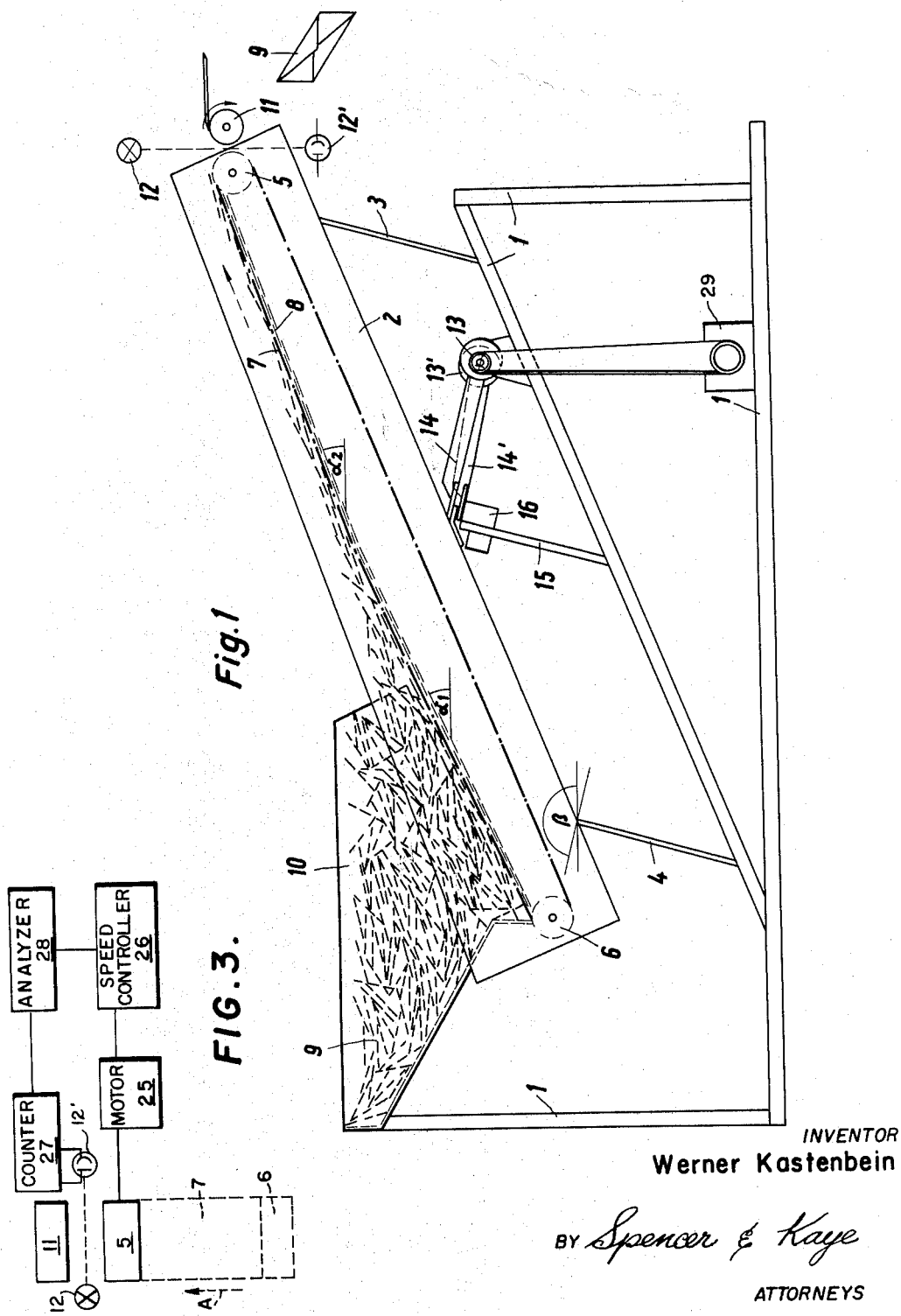
FIGURE 1 is a schematic side view illustrating an embodiment of a quantitative regulating device in accordance with the present invention.

With more particular reference to the drawings, a substructure 1 is illustrated schematically and includes parts which are rigidly mounted together. A frame 2 is mounted on substructure 1, and is provided with side walls. This frame is supported for vibrating movement in a particularly simple and advantageous manner using two pairs of leaf springs 3 and 4, respectively. A driving roller 5 is rotatably mounted on the frame, as is a guide roller 6. A conveying belt 7, illustrated in phantom lines, is disposed about the driving roller 5 and the guide roller 6. A supporting plate providing a supporting surface 8 for the conveying belt is fastened between the side walls of frame 2. A feeding funnel 10 is provided near the lower or feed end of the conveying belt 7 and this funnel contains shipments 9 which are delivered thereto. Near the upper or discharge end of the conveyor belt there is a roller 11 driven in the conveying direction and preferably at a higher linear speed than the conveying belt 7 so as to advantageously effect the regulated delivery of shipments on the belt. A light barrier device 12, 12' is provided between drive roller 5 and delivery roller 11 and this is schematically shown in FIGURE 1. This light barrier arrangement is used for monitoring the density of conveyed shipments at this point.

As shown in FIGURE 3, the drive roller 5 of conveying belt 7 is driven by means of a motor 25 in the direction of the dashed arrow A and the conveying speed may be regulated for example by a speed controller 26 in conjunction with a device for monitoring and controlling the density of shipments which device may also include the shipment sensing device 12, 12', a counter 27, and an analyzer and/or comparator 28.

The means for driving the frame in a vibrating manner are provided by an arrangement which is known per se and which includes, for example, an eccentric 13 and a connecting or driving rod 14 connected to frame 2, a further eccentric 13', 180° out of phase with respect to eccentric 13, a connecting rod 14', and a counter weight 16 supported by a leaf spring 15 and serving to balance the masses.

The eccentrics may be driven with variable speeds of rotation by means of a suitable adjustable drive unit 29. As a further feature of the invention, means, which are known per se, can be provided for varying the amplitude of the vibrations. In this embodiment of the invention, the frame 2 is mounted on the sets of leaf springs 3 and 4, respectively, and the vibratory drive is so arranged that the main component of the frame motion or moving path with respect to the conveying direction of belt 7 subtends an angle $\beta$ of about 165° with the horizontal.

The mail shipments 9 are introduced into the feeding funnel 10 and they are pulled out of the zone of the feeding funnel by the conveying belt 7 at a moderate speed. Due to the vibratory motion which is superimposed on the belt and which acts in opposition to the conveying direction, and due to the different coefficients of friction of paper against paper on the one hand, and paper against a frictional coating on the other hand, the letters and parcels and other articles constituting the shipments lying on top and not contacting the belt directly are not carried forwardly with as much frictional force as the shipments lying directly on the conveying belt. Those shipments which are lying on top and do not contact the belt directly slide rearwardly in the direction of the feeding funnel, whereas those shipments which are lying directly on the belt are securely carried along by the belt. In this manner a thin layer of shipments may be taken from a large heap of mail. This process as well as the effectiveness of the device are both influenced by the different parameters, for example, by the ascending angle of belt 7 and its conveying speed, as well as by the direction, amplitude and frequency of the vibrating motion of frame 2. The ascending angle of the belt and the vibratory path of the frame and, under certain circumstances, the amplitude also, may optimally be determined empirically, while the other parameters may be regulated independently of one another and thus can be adjusted to the ambient operating conditions which are present at the time, for example, the humidity of the air and the like.

The direction of the vibrating motion may be changed by changing the inclination of leaf spring sets 3 and 4, and by changing the angle of the plane of movement of rods 14 and 14' with respect to frame 2. The amplitude of the vibrating motion may be adjusted by changing the eccentricity of eccentric 13. The frequency of this motion may be changed by varying the rotational speed of eccentric 13.

The speed of conveyor belt 7 may be changed by varying the speed of the motor 25 by means of speed controller 26 which may be manually adjusted.

Due to the relatively great feeding height and in order to counteract the mutual adherence of the shipments in as effective a manner as possible, it is preferable to select the ascending angle $\alpha$ of the conveying belt and the frequency of the vibratory motion in the vicinity of the feed to be such that a sliding or slippage is provided between the paper and the friction coating. In other words, the conveyed layer of shipments will have a certain slippage with respect to the conveying belt. However, such a selection of parameters would be disadvantageous for the subsequent fine dosing or regulation in the vicinity of the discharge end of the belt where a sliding of the directly adhering shipments with respect to the friction coating is no longer desired.

Because of these circumstances and considerations, the embodiment in FIGURE 1 is provided with the supporting surface 8 disposed under the conveying belt 7 which, in its portion in proximity to the discharge end thereof, is provided with a smaller angle of inclination with respect to the horizontal than in its portion which is disposed in proximity to the feed. For example, near the feed the angle $\alpha_1=25°$ whereas in the vicinity of the discharge of the belt $\alpha_2=20°$. The steep portion of belt 7 provides the desired loosening of the delivered shipments, whereas the flatter or less inclined portion serves to provide a thin extensively continuous conveying stream of shipments.

In order to further equalize the fluctuations in conveying density which still remain, means may be provided in accordance with the present invention to automatically increase the conveying speed of the belt, when the conveying density at the discharge end decreases below a predetermined magnitude and vice versa. Such means, for example, are shown in FIGURE 3. As mentioned above, a light barrier arrangement 12, 12' is provided for monitoring the conveying density. This light barrier arrangement is then connected with a motor regulating device which includes analyzer 28 and controller 26 for regulating the drive for the belt.

Figure 2:
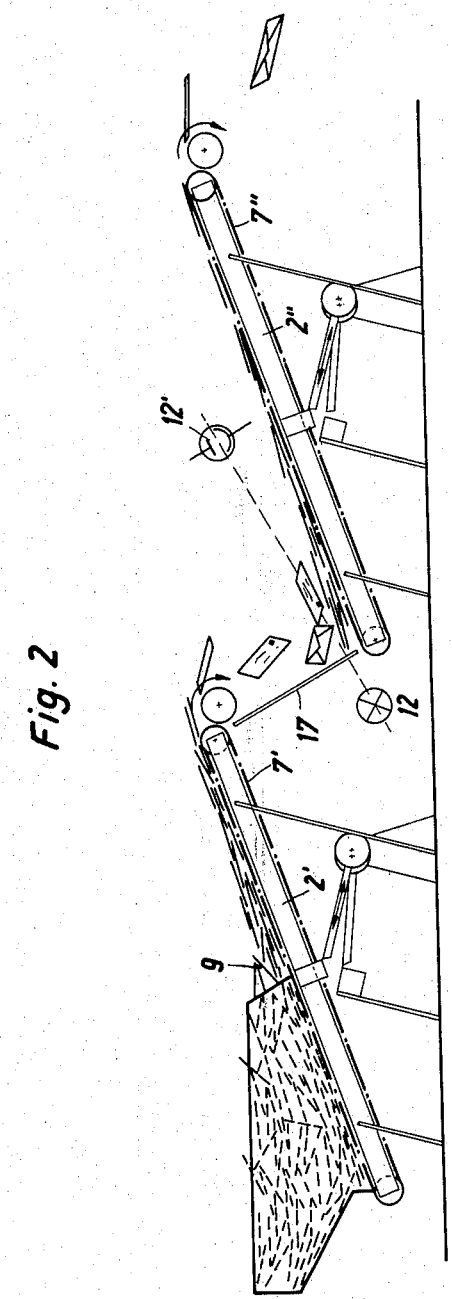
FIGURE 2 is a schematic side view similar to FIGURE 1, but illustrating a further embodiment in which two conveying belts arranged one after the other are each mounted in a frame in a vibratory manner.

Another feature of the invention for optimally fulfilling the conditions which are necessary for loosening the shipments and providing a fine dosing thereof, is shown in the embodiment illustrated in FIGURE 2. Two conveying belts 7', 7" are provided which are mounted in frames 2' and 2", respectively, both of which are mounted in a vibratory manner. These belts are connected in series by means of a connecting slide or chute 17. In this embodiment not only are the angles of ascension and the conveying speeds of the conveying belts chosen and regulated independently from one another, but also the directions, amplitudes and frequencies of their vibrating drives are chosen and are regulated independently of each other in such a manner that the optimal effectiveness of the device may be obtained. The details and mode of operation of the two conveying belts are similar to that of the belt described in connection with FIGURE 1.

In an operative embodiment of a device according to FIG. 1 the normal linear speed of belt 7 may be 2.5 inches and the increased speed 3.5 inches per second. Roller 11 may have a circumferential speed of 80 inches per second. The vibrating frequency of frame 2 may be variable between 7 and 11 cycles per second and the amplitude of its oscillation 0.28 inch. For belt 7 a frictional coating of natural rubber has proved to be suitable.

It will be understood that the above description of the present invention is susceptible to various modifications, changes, and adaptations, and the same are intended to be comprehended within the meaning and range of equivalents of the appended claims.

What is claimed is:

1. In a device for quantitatively regulating the feeding of a conveying path or a further processing device with predominantly flat shipments and especially mail shipments using an ascending conveying belt having a friction coating; the improvement wherein said conveying belt includes: a frame, drive an guide rollers, and a supporting surface, said rollers and surface being supported by said frame and arranged with the belt ascending in its conveying direction at an acute angle with the horizontal; said improvement including means supporting and driving said frame for vibratory movement acting in opposition to the conveying direction for causing lagging, with respect to the conveying motion of the belt, of those shipments which are not directly lying upon the belt, said supporting and driving means providing a main component of vibratory movement which, with respect to the conveying direction of the belt, subtends an angle with the horizontal which is larger than 90°.

2. A device as defined in claim 1 wherein the angle of the main component of the conveying path is larger than 90° plus said acute angle.

3. A device as defined in claim 2 wherein said supporting and driving means include leaf springs.

4. A device as defined in claim 1 comprising means for sensing the shipment conveying density at the discharge end of said conveying belt for varying the conveying speed and automatically increasing the conveying speed of said belt when the conveying density decreases below a predetermined magnitude.

5. A device as defined in claim 4 wherein said means for varying the conveying speed and said means for supporting and driving said frame for vibratory movement are both variable but independent of each other.

6. A device as defined in claim 1 wherein said supporting surface in proximity of the discharge end of said conveying belt has a smaller angle of inclination with respect to the horizontal than in the area which is in proximity to the feed of said belt.

7. A device as defined in claim 1 comprising a second conveying belt similar to the first-mentioned conveying belt, said belts being disposed one after the other.

8. A device as defined in claim 1 comprising a conveying roller adjacent the discharge end of said conveying belt and driven in the conveying direction and having a linear speed which is greater than the conveying speed of said belt.

References Cited by the Examiner

UNITED STATES PATENTS

| | | | |
|---|---|---|---|
| 275,809 | 4/1883 | Duffield | 198—220 |
| 2,961,085 | 11/1960 | Stovall | 198—37 |

FOREIGN PATENTS 703,492   2/1954   Great Britain.

OTHER REFERENCES

German printed application, 1,085,813, July 1960.

SAMUEL F. COLEMAN, *Primary Examiner.*

WILLIAM B. LABORDE, *Examiner.*